UNITED STATES PATENT OFFICE.

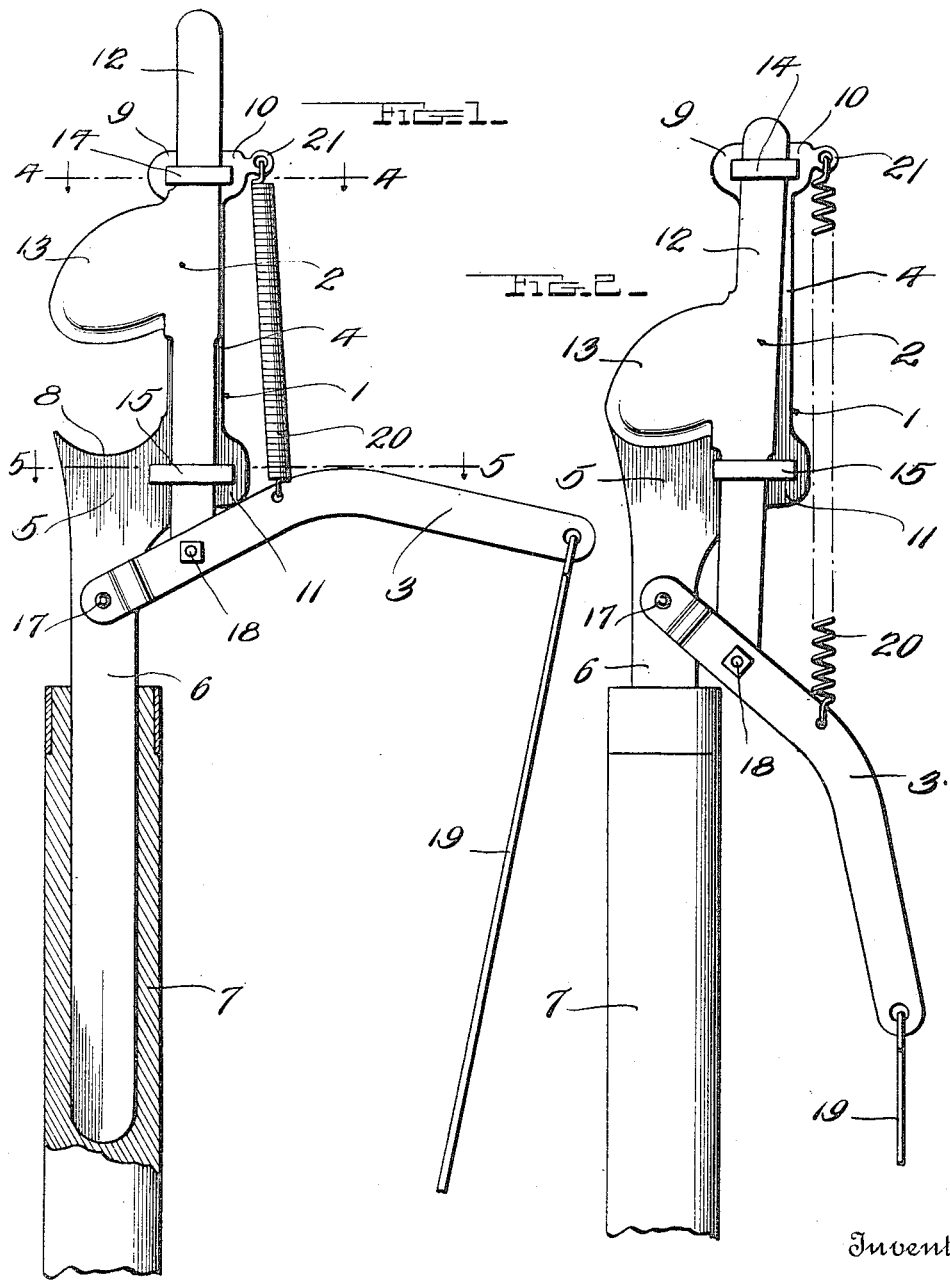

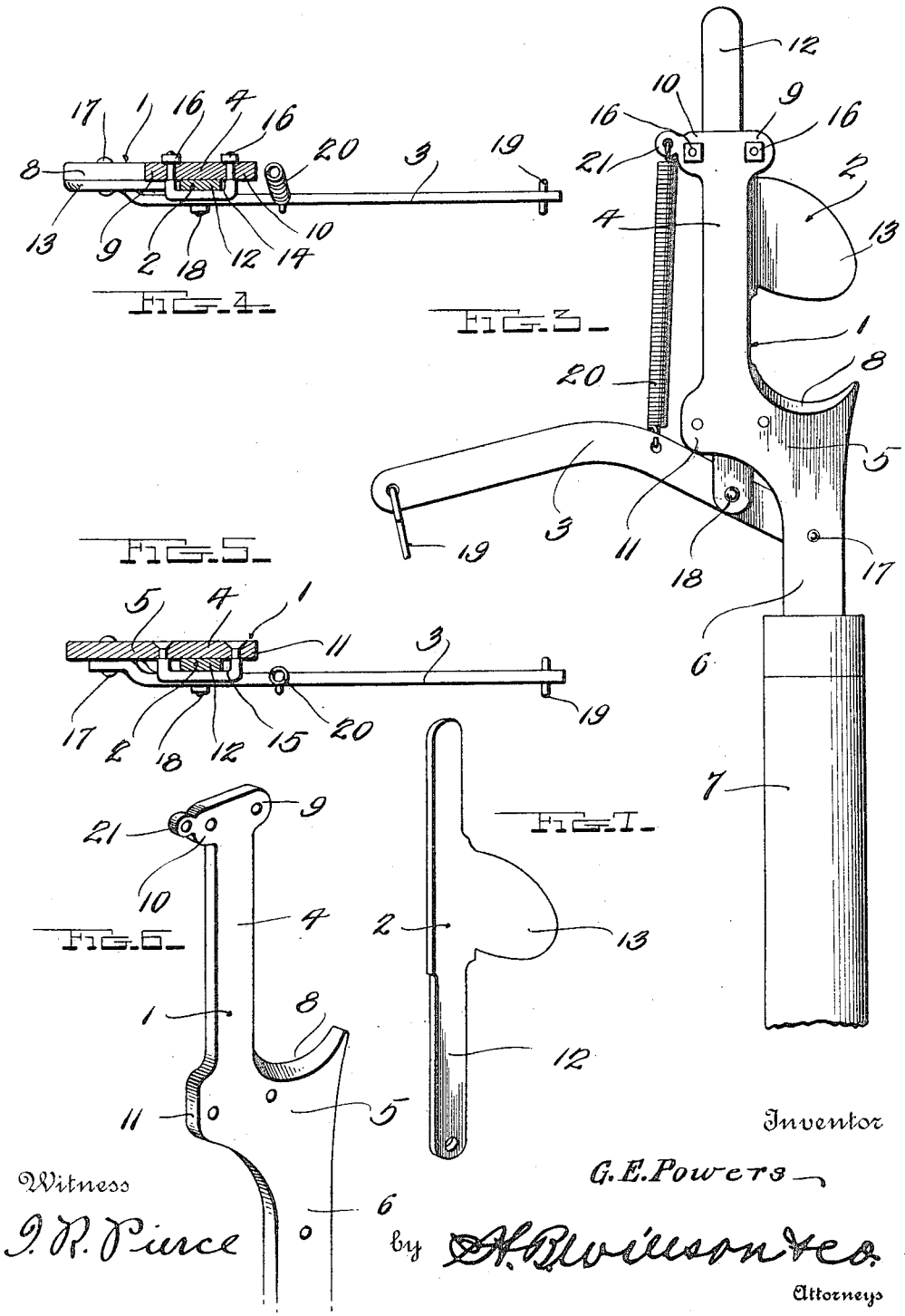

GEORGE E. POWERS, OF XENIA, OHIO.

TREE-TRIMMER.

1,209,999.  Specification of Letters Patent.  Patented Dec. 26, 1916.

Application filed May 15, 1916. Serial No. 97,629.

*To all whom it may concern:*

Be it known that I, GEORGE E. POWERS, a citizen of the United States, residing at Xenia, in the county of Greene and State of Ohio, have invented certain new and useful Improvements in Tree-Trimmers; and I do declare the following to be a full, clear, and exact description of the invention, such as will enable others skilled in the art to which it appertains to make and use the same.

My invention is an improved device for trimming trees and the like, the object being to provide an extremely simple and inexpensive tool of this class which regardless of these characteristics will be highly efficient and durable.

With this general object in view, the invention resides in certain novel features of construction to be hereinafter fully described and claimed, the descriptive matter being supplemented by the accompanying drawings which constitute a part of this application and in which:

Figures 1 and 2 are elevations of one side of the improved trimmer showing two different positions of parts; Fig. 3 is an elevation of the opposite side of the device positioned as shown in Fig. 1; Figs. 4 and 5 are detail horizontal sections taken respectively on the planes of the lines 4—4 and 5—5 of Fig. 1; and Figs. 6 and 7 are perspective views of the fixed and movable cutting members.

In specifically describing the structure shown in the drawing above briefly described, similar characters will be placed on corresponding parts throughout the several views and reference will be herein made to the numerous elements by their respective indices. To this end, the numerals 1 and 2 designate respectively the fixed and movable cutting members of the device, while 3 refers to the operating lever for actuating said movable member.

The fixed member 1 is stamped from a single metal plate and is shaped to form a vertical post 4 having a laterally turned lower end 5 and an attaching shank 6 depending from said end 5 for reception in the upper end of an appropriate handle 7. The upper edge of the laterally directed end 5 of the post 4 is concave and sharpened as indicated at 8, said edge constituting a fixed blade. The upper end of the post 4 is increased in width to form front and rear ears 9 and 10, while the rear edge of said post at the lower end thereof is increased in width as indicated at 11.

The movable cutting member 2 is also stamped from a single metal plate and comprises a vertical bar 12 and a cutting blade 13 projecting from one edge thereof, one side of said bar contacting slidably with one side of and extending above and below the post 4. The member 2 is held in this position by upper and lower U-shaped guides 14 and 15, the latter straddling the lower end of the bar 12 and having its ends upset in openings formed through the widened lower end of the post 4. The upper guide 14 is in the form of a U-bolt passing through the ears 9 and 10 and shouldered to prevent the nuts 16 thereof from drawing it into binding contact with the bar 12.

The lever 3 is fulcrumed at one end to the upper end of the shank 6 as indicated at 17, said lever being pivoted adjacent this end to the lower end of the bar 12 as designated by the numeral 18. A wire, rod or the like 19 is connected to the free end of the lever 3 and extends therefrom to the lower end of the handle 7 for operating said lever at will regardless of the length of said handle. The lever in question is normally raised to position the blade 13 above the blade 8 by a coiled spring 20 anchored at its lower end to said lever and at its upper end to a lug 21 which extends rearwardly from the ear 10.

By constructing the device in the manner shown and described, it may be manufactured easily and inexpensively, yet it will be a highly efficient and durable tool. It is to be observed that downward movement of the lever 3 not only moves the blade 13 in a downward direction, but due to the fact that the pivot 18 travels on an arc around the fulcrum 17, said blade will be forced forwardly and will thus exert a shearing cut on the limb being severed. This permits the device to act much more advantageously than would otherwise be possible.

From the foregoing taken in connection with the accompanying drawings, the construction, manner of operation and advantages of the improved device will be readily understood without requiring a more extended explanation. I will state, however, that although certain specific details have been shown and described for accomplishing probably the best results, numerous changes may be made within the scope of the invention as claimed without sacrificing the main advantages thereof.

I claim:

A tree trimming device comprising a fixed cutting member formed of a single metal plate and comprising a post having a laterally directed lower end and an attaching shank depending from said end, the upper edge of the latter being concave and constituting a fixed cutting blade and the upper end of said post having ears formed on its front and rear edges, the rearmost ear having a rearwardly projecting apertured lug, a U-bolt whose ends are passed through said ears, a vertical bar contacting slidably with one side of the post and having its upper end received in said U-bolt, another U-bolt straddling the lower end of said bar and having its ends passed through the lower end of the post, the intermediate portion of this U-bolt being in contact with the outer face of said vertical bar, while the arms thereof are spaced from the edges of said bar to permit the latter to move edgewise with the first-named U-bolt as a pivot, a second blade projecting from the front edge of said vertical bar for coöperation with the first-named blade, an operating lever fulcrumed at one end to the shank and pivoted to the lower end of said bar, and a coil spring secured at one end to the aforesaid apertured lug and at its other end to said lever.

In testimony whereof I have hereunto set my hand in presence of two subscribing witnesses.

GEORGE E. POWER.

Witnesses:
J. KENNETH WILLIAMSON,
F. T. TARBOX.

Copies of this patent may be obtained for five cents each, by addressing the "Commissioner of Patents, Washington, D. C."